Figures 1, 2:
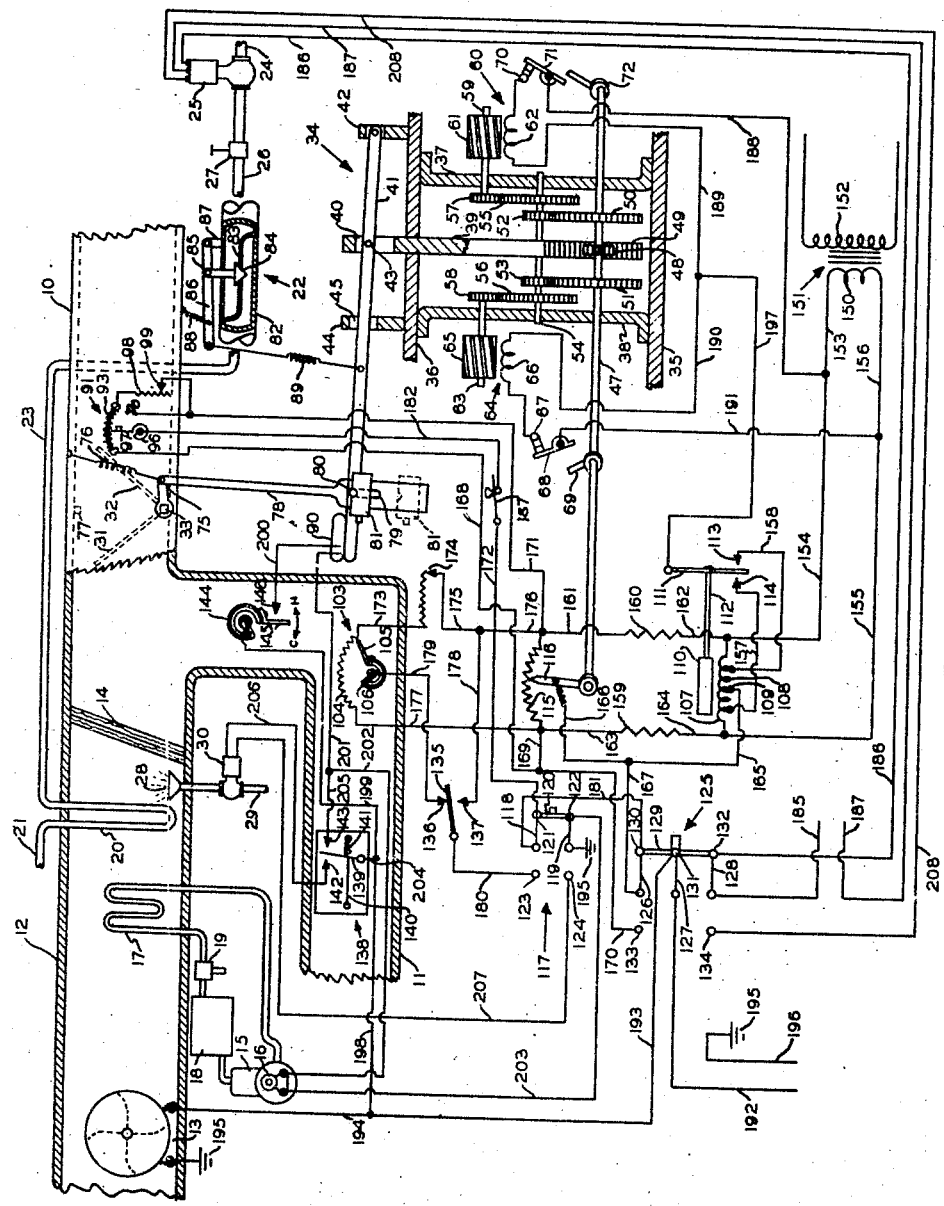

July 12, 1938.   G. D. KINGSLAND   2,123,428
SUMMER-WINTER AIR CONDITIONING SYSTEM
Filed June 6, 1934

Inventor
*George D. Kingsland*
By *George H. Fisher*
Attorney

Patented July 12, 1938

2,123,428

UNITED STATES PATENT OFFICE 2,123,428

SUMMER-WINTER AIR CONDITIONING SYSTEM

George D. Kingsland, Minneapolis, Minn., assignor to Minneapolis-Honeywell Regulator Company, Minneapolis, Minn., a corporation of Delaware Application June 6, 1934, Serial No. 729,253        REISSUED 45 Claims. (Cl. 236—1)

The present invention relates to temperature control systems by means of which a building or other space is maintained at a desired temperature or within a desired temperature range during the entire year by furnishing heat or cooling as may be required.

One of the principal objects of the invention is the provision of a temperature control system for maintaining the temperature of a building or space at a desired temperature or within a desired temperature range during the entire year in which a minimum number of controls is utilized and in which a minimum number of manual operations are required to change the system from its winter automatic heating operation to its summer automatic cooling operation.

A further object of the invention is the provision of a cooling system wherein a large supply of outside air is furnished to the building or space when the temperature of the outside air is approximately that desired within the space or building, the supply of outside air being decreased as the temperature of the outside air rises above or falls below the desired inside temperature, together with cooling means which is controlled in accordance with fluctuations of the building or space temperature in order to maintain the building or space temperature at the desired value or within given limits.

A further object of the invention is the provision of a cooling system in which there is provided a large supply of fresh outside air when the outside temperature is about that desired in the space or building, decreasing the supply of outside air as the outside temperature rises and operating a cooling means to maintain the space temperature at the desired point and also decreasing the supply of outside air as the outside temperature falls below the desired building or space temperature and rendering the cooling means inoperative when the outside air temperature falls below some minimum value.

A further object of the invention is the provision of a cooling system in which a variable amount of outside fresh air is supplied to the space or building to be cooled as the temperature of the outside air rises until a predetermined minimum amount of outside air is being supplied to the space or building and then maintaining this predetermined minimum supply of outside air upon further rise in outside temperature so that there will always be a minimum supply of fresh air for ventilating purposes and thereafter totally discontinuing the supply of fresh outside air in the event the outside temperature becomes excessively high.

A further object of the invention is the provision of a cooling system in which a cooling means is normally operated in accordance with fluctuations in the temperature of the space or building to be cooled in order to maintain the temperature thereof at a desired point or within desired limits and additionally operating the cooling means even though the space temperature is at the desired point or within the desired limits provided the relative humidity of the air in the space reaches a predetermined maximum value.

Another object of the invention is the provision of a heating system for maintaining the temperature of a space or building at a desired point or within desired limits, together with means for supplying a variable amount of fresh outside air to the space or building in the event the temperature thereof becomes excessive or approaches the permissible high limit, the arrangement preferably being such that whenever cold outside air is being supplied to the space or building no heat is being supplied thereto and that when heat is being supplied to the space or building no outside fresh air is being supplied thereto. In the preferred form of this phase of the invention, means are further provided for preventing the relative humidity from falling below a predetermined minimum value.

A further object of the invention is the provision of a heating and cooling system for a space or building whereby the space is automatically heated in the winter and automatically cooled when necessary in the summer, together with manually operable means for furnishing a complete supply of outdoor air in order to quickly ventilate the space being controlled irrespective of whether the system is operating on a heating or a cooling cycle.

Another object of the invention is the provision of a single manual master control by means of which the system can be rendered entirely inoperative by a single operation irrespective of whether the system is being operated on the winter cycle or on the summer cycle.

In the preferred form of the invention, the automatic control system is entirely electrical and automatic both for summer and winter operation and in order to change over from summer to winter operation, it is only necessary to operate a reversing switch and to make one or two simple mechanical adjustments.

Further objects of the invention will be found in the detailed description, the drawing, and the appended claims.

For a more complete understanding of the invention, reference may be had to the following description and accompanying drawing in which, Fig. 1 is a diagrammatic showing of the complete control system and the manner in which it is associated with the heating and cooling means, the parts being shown adjusted for summer operation, and, Fig. 2 is an enlarged schematic showing of one of the controllers used in the system of the present invention when operating on the summer cycle.

Referring to the drawing, the heating, cooling and ventilating mechanism is illustrated as comprising an outside air duct 10 which is in communication with the outside atmosphere, a return air duct 11 which communicates with the space or building to be controlled, and a heating and cooling chamber or duct 12, one end of which communicates with the outside atmosphere and return air ducts 10 and 11 respectively and the other end of which communicates with the space or building to be controlled. Located within the chamber or duct 12 is an electrically operated fan or blower 13 by means of which air is supplied to the space or building, the air being drawn through the chamber 12 and the outside air duct 10 and/or the return air duct 11. This chamber 12 is preferably provided with air filters 14 of usual construction for cleansing the air delivered to the space or building to be controlled.

A cooling system is herein shown as comprising a compressor 15 which is driven by an electric motor 16, the compressor being connected to a cooling coil 17 located within the chamber 12 through the usual condenser 18 and mechanical expansion valve 19. Such cooling systems are well-known in the art and no further explanation thereof is thought necessary herein, it being noted that whenever compressor motor 16 is energized, the cooling coil 17 will be conditioned to cool the air passing thereover and when the compressor motor 16 is deenergized, the cooling coils 17 will no longer operate to provide further substantial cooling.

The heating system is shown as comprising heating coils 20 located within chamber 12 and connected by a pipe 21 to the usual return line or discharge. The heating coils 20 connected to a proportioning steam valve, generally indicated at 22 by means of a pipe 23. In this particular embodiment of the invention, it is assumed that the steam is supplied from a central or district supply station through a pipe 24 but it will be appreciated that the supply of steam could be obtained from a steam boiler located in the building itself. The pipe 24 is connected to an electrically operable two-position steam valve 25 by means of which the supply of steam may be completely turned on or off and this electrically operable two-position steam valve 25 is connected to modulating or proportioning steam valve 22 by means of a pipe 26, the pipe 26 preferably including a manually operable shut-off valve 27.

The means for preventing the relative humidity from falling below a predetermined minimum value during the winter is herein shown as comprising a water spray 28 located in chamber 12 in front of heating coils 20. This water spray 28 is connected to a water supply pipe 29 through an electrically operable water valve 30.

Located within the outside air duct 10 is a damper mechanism comprising a pair of dampers indicated at 31 and 32 which diverge at an angle of substantially 90°, the adjacent edges of the dampers 31 and 32 being fastened to a damper shaft 33 which extends outside of the outdoor air duct 10. The arrangement is such that when either of the dampers 31 or 32 is in a vertical position no air can be drawn in from the outdoors and as the dampers 31 and 32 move to the position shown in Fig. 1 of the drawing, a variable amount of outside air may be drawn through outside air duct 10, the maximum supply of outside air being obtainable when the dampers are in the position shown wherein each of the dampers 31 and 32 is equally displaced from a vertical position.

A single motorized operating mechanism, generally indicated at 34, is utilized to control the dampers 31 and 32 and the modulating or proportioning steam valve 22 both in the summer and during the winter. This motorized operating mechanism comprises a base plate 35, an upper frame plate 36, and a pair of side plates 37 and 38 respectively. A main actuating rod 39 is located between side plates 37 and 38 and extends through upper frame plate 36. This main actuating rod is provided with an opening 40 for the reception of a lever 41 which is pivotally secured to a bracket 42 carried by upper frame plate 36. The lever 41 is operated by a pin 43 which is secured to the main actuating rod 39 and passes through an appropriate opening in lever 41. A second bracket 44 which is carried by upper frame plate 36 is provided with an opening 45 which receives lever 41 and acts to guide the same in its vertical movements. A main actuating shaft 47 is journalled in side plates 37 and 38 and has secured thereto a pinion 48 which meshes with teeth 49 formed on the lower portion of main actuating rod 39. Also secured to main operating shaft 47 is a pair of gears 50 and 51 which mesh with a pair of pinions 52 and 53 secured to a shaft 54 journalled in side plates 37 and 38. A pair of gears 55 and 56 which are also secured to shaft 54 mesh with a pair of motor pinions 57 and 58. Motor pinion 57 is secured to a rotor shaft 59 of a motor 60 which includes a rotor 61 and a field winding 62. In a similar manner, motor pinion 58 is secured to a rotor shaft 63 of a motor 64 which includes a rotor 65 and a field winding 66. Upon energization of field winding 62, the rotor 61 of motor 60 rotates in such direction as to rotate main operating shaft 47 in a counter-clockwise direction as viewed from the left in Fig. 1, whereby pinion 48 lowers main actuating rod 39 and the extended end of lever 41 is moved downwardly. The rotor 65 of motor 64 rotates in the reverse direction when its field winding 66 is energized with the result that main operating shaft 47 rotates in a clockwise direction, whereby pinion 48 raises main actuating rod 39 and the extended end of lever 41 is moved upwardly. The limit of upward movement of lever 41 under the action of motor 64 is determined by a limit switch comprising a stationary contact 67, a pivoted limit switch arm 68, and a cooperating limit switch actuator 69 which is secured to main operating shaft 47. Similarly, the limit of downward movement of lever 41 under the action of motor 60 is determined by a limit switch comprising a stationary contact 70, a pivoted limit switch arm 71, and a cooperating limit switch actuator 72 carried by main operating shaft 47.

A crank 75 is secured to damper shaft 33 and is continuously biased for movement in a counter-clockwise direction by means of a spring 76, whereby there is a tendency to move damper 32 to its vertical position wherein it engages a stop 77. The upper end of a link 78 is pivoted to the outer end of crank 75. The lower end of link 78 is provided with an elongated slot 79 which receives a pin 80 carried by lever 41. A bracket 81 which is adjustable upon the lower end of link 78 is adjusted to the position shown in the drawing for summer operation whereby there is no lost motion between pin 80 and link 78 and dampers 31 and 32 are moved in exact accordance with the movements of lever 41.

The modulating or proportioning steam valve 22 comprises a casing 82 having the usual partition wall 83 therein which is provided with a valve opening. A valve 84 cooperates with the valve opening and is carried by a stem 85, the upper end of which is pivoted to a link 86. One end of link 86 is pivoted to a bracket 87 carried by casing 82. The link 86 is normally biased to move upwardly by means of spring 88 so as to open the valve and allow the flow of steam through the valve 22. The extended end of link 86 is connected to lever 41 through means which include a spring 89. The lever 41 carries a mercury switch 90 which is positioned to open when the lever reaches a predetermined position during upward movement.

The motorized operated mechanism 34 is adapted to be controlled during the summer time by an outdoor controller 91 which is diagrammatically shown in detail in Fig. 2. This outdoor controller comprises an insulating support 92 upon which an outdoor resistance 93 is wound, one end of resistance 93 being connected to a metallic cap 94 and the other end thereof being connected to a metallic cap 95. The outdoor controller 91 further includes a thermostatic element herein shown in the form of a curved bimetallic element 96, having one end secured and the other end of which carries a movable contact finger 97 that is adapted to sweep across resistance 93 upon changes in the outdoor temperature. The outdoor controller 91 may be located out of doors or in any other position such as to respond to changes in outdoor temperature, for example, in the outdoor air duct 10, there always being sufficient movement of air through this duct even when the damper 31 or 32 is closed to actuate element 96. The contact finger 97 moves equal distances along resistance 93 for equal temperature changes but in the preferred form of the invention, the resistance 93 is wound upon support 92 in a tapered or uneven fashion. When the outdoor temperature is approximately 65°, contact finger 97 engages metallic cap 94. When the outdoor temperature is approximately 80°, the contact finger 97 engages metallic cap 95. The winding 93 is tapered or wound in such manner that when the outdoor temperature is 70° F., the contact finger 97 while not being half way between metallic caps 94 and 95, nevertheless contacts the effective center of resistance 93, whereby there is approximately an equal amount of resistance between contact finger 97 and metallic caps 94 and 95. Cap 95 is connected to a resistance 98 which is engaged by a manually adjustable contact 99 connected to an adjustable screw 100 by a wire 101. When the outdoor temperature rises to approximately 85° F. or some other excessive temperature depending upon the adjustment of the contact screw 100, a contact 102 which is carried by movable contact finger 97 engages contact screw 100 so as to shunt that portion of resistance 98 which was theretofore connected in series with resistance 93.

The mechanism 34 is adapted to be controlled by an indoor controller 103 during the winter. This indoor controller 103 comprises a uniformly wound indoor resistance 104 and a cooperating contact finger 105 which is positioned by a curved bimetallic element 106. The bimetallic element 106 responds to the space or building temperature and may be conveniently located in the return air duct 11. In this particular embodiment of the invention, the contact finger 105 moves from one extreme end of resistance 104 to the other end thereof upon a predetermined indoor temperature change equal to the permissible change in indoor temperature, say 2° F.

The outdoor and indoor controllers 91 and 103 are adapted to control the respective energizations of a pair of solenoid coils 107 and 108 which are connected in series, their junction being indicated at 109. Solenoid coils 107 and 108 conjointly position a plunger 110 which is connected to a flexible relay switch arm 111 by a rod 112. Relay switch arm 111 cooperates with relatively stationary contacts 113 and 114. The respective energizations of solenoid coils 107 and 108 are also controlled by a balancing resistance 115 which is traversed by a balancing contact finger 116 that is actuated by main operating shaft 47.

A summer-winter reversing switch generally indicated at 117 comprises switch arms 118 and 119 which are adapted to be simultaneously operated by an insulated handle 120. In the summer position, switch arm 118 engages a contact button 121 and the switch arm 119 engages a contact button 122. In the winter position, the switch arm 118 engages a contact button 123 and the switch arm 119 engages a contact button 124. A master switch, generally indicated at 125, comprises switch arms 126, 127 and 128 which are adapted to be simultaneously operated by an insulated connecting handle 129. The master switch is normally in the position shown wherein switch arm 126 engages a contact button 130, switch arm 127 engages a contact button 131, and switch arm 128 engages a contact button 132. The master switch 125 however may be operated to an opposite position wherein switch arm 126 engages a contact button 133, switch arm 127 is entirely disconnected from the system, and switch arm 128 engages a contact button 134.

A manually operable ventilating switch for winter operation comprises a switch arm 135 which normally engages a contact 136 but may be operated manually to disengage contact 136 and engage a contact 137. A manually operable switch arm 187 may be utilized for summer ventilation as will hereinafter appear.

A relative humidity responsive control is shown at 138 and comprises a pivoted switch arm 139 which is operated by a humidity responsive element 140, a spring 141 normally biasing switch arm 139 out of engagement with a contact 142 against the action of humidity responsive element 140 and into engagement with a contact 143. The humidity responsive element 140 responds to the relative humidity in the space to be controlled and may be placed either directly in the space or in the return air duct 11 as shown in the drawing. The humidity responsive element 140 expands upon an increase in relative humidity.

An indoor thermostat comprises a curved bimetallic element 144 which operates a flexible blade 145 and moves the same into engagement with a contact 146 when the indoor space temperature rises to some predetermined maximum value. The bimetallic element 144 may be located directly in the space, or situated in the return air duct as shown in the drawing as long as it responds to the temperature of the air in the space.

Power is supplied to the mechanism 34 and associated control devices by the low voltage secondary 150 of a step down transformer 151, having a high voltage primary 152 which is connected to the usual line wires. The series connected solenoid coils 107 and 108 are connected across the secondary 150 by means of wires 153, 154, 155 and 156. A small number of turns of solenoid coil 107 is connected to contact 114 by a wire 157 and a small number of turns of solenoid coil 108 is connected to contact 113 by a wire 158. Balancing resistance 115 is connected in parallel with the series connected solenoid coils 107 and 108 through protective resistances 159 and 160 by means of wires 161, 162, 163 and 164. The junction 109 of solenoid coils 107 and 108, balancing contact finger 116, and switch arm 126 are interconnected by means of wires 165, 166 and 167. The contact 99 is connected to the right end of balancing resistance 115 by a wire 171. The left end of outdoor resistance 93 is connected to the left hand end of balancing resistance 115 and to contact button 133 by wires 168, 169 and 170. Contact finger 97 is connected to contact button 121 through switch arm 187 by wires 172 and 182. The left hand end of indoor resistance 104 is connected to the left hand end of balancing resistance 115 by a wire 177. The right hand end of indoor resistance 104 is connected to the right hand end of balancing resistance 115 and to contact button 137 through a manually adjustable rheostat 174 by means of wires 173, 175, 176 and 178. Contact finger 105 is connected to contact button 136 by a wire 179. Switch arm 135 of winter ventilating switch is connected to contact button 123 by a wire 180. Switch arm 118 of summer-winter switch 117 is connected to contact button 130 of master switch 125 by a wire 181. The remaining circuit connections and the various control and operating circuits will be pointed out in connection with the summer and winter operations of the system.

*Summer operation*

The parts are shown in their automatic summer operating position. In other words, the master switch 125 has its switch arms 126, 127 and 128 engaged with contact buttons 130, 131 and 132. The summer-winter switch 117 has its switch arms 118 and 119 engaged with contact buttons 121 and 122. Switch arm 135 of ventilating switch is engaged with contact 136. Indoor control resistance 104 and the rheostat 174, in series, are therefore connected directly in parallel with balancing resistance 115 and the series connected solenoid coils 107 and 108. Contact finger 105 is disconnected from the control system inasmuch as switch arm 118 of the summer-winter switch 117 is not engaged with contact button 123. The indoor controller 103 therefore can have no effect on the operation of the system upon changes in indoor temperature. The resistances 93 and 98 of outdoor controller 91, in series, are also connected directly in parallel with balancing resistance 115 and the series connected solenoid coils 107 and 108. Contact finger 97 is electrically connected to the junction 109 of solenoid coils 107 and 108 and to balancing contact finger 116 since switch 187 is closed, switch arm 118 of summer-winter switch 117 is engaged with contact button 121, and the switch arm 126 of master switch 125 is engaged with contact button 130. The outdoor temperature is approximately 75° F., and the contact finger 97 thereof is engaging the effective center of the combined resistances 93 and 98, for the particular adjustment of contact 99 shown in the drawing, and balancing contact finger 116 is engaging the center of balancing resistance 115 whereby solenoid coils 107 and 108 are equally energized. Therefore plunger 110 is in a central position wherein relay switch arm 111 is midway between contacts 113 and 114. Lever 41 is in its mid-position whereby dampers 31 and 32 are positioned to allow a full flow of outdoor air to the chamber 12 and to the space or building to be controlled. Modulating or proportioning steam valve 22 is closed. In the event district or central steam is being used, the manual shut off valve 27 should be manually closed. The two-position valve 25 however, is in its open position by a circuit as follows: line 185, switch arm 128 of master switch 125, contact button 132, wire 186, two-position valve 25, and line 187. The two-position valve 25 is preferably of the type which moves to one of its positions upon energization of a first circuit whereupon said circuit is broken and the valve remains in said position until the completion of a second circuit whereupon the valve moves to its other extreme position after which the second circuit is broken. Such valves are well-known in the art. Field windings 62 and 66 of motors 60 and 64 are connected in series across secondary 150 by the following circuit: secondary 150, wire 153, wire 188, limit switch arm 71, contact 70, field winding 62, wire 189, wire 190, field winding 66, contact 67, limit switch arm 68, wire 191 and wire 156 to the other side of secondary 150. Lever 41 therefore remains stationary inasmuch as the two motors 60 and 64 are of equal power and are opposing each other. Electrical blower 13 is continuously energized by the following circuit: line 192, switch arm 127 of master switch 125, contact button 131, wire 193, wire 194, blower 13 and ground 195 to line 196. The relative humidity is not excessive as indicated by switch arm 139 being out of engagement with contact 143 and the indoor temperature is not excessive since flexible blade 145 is disengaged from contact 146. Mercury switch 90 is in its open position. It might be noted at this time that mercury switch 90 is open when lever 41 is in its upper half portion of movement and is closed when lever 41 is in its lower half portion of movement although other adjustments could be used if found desirable. Compressor motor 16 and water valve 30 are both deenergized so that no water is issuing from spray 28 nor is any cooling of the building being effected.

So long as the outside air temperature remains constant, the blower 13 will continuously supply a maximum quantity of fresh outdoor air to the space to be cooled so that the space will be at a very comfortable temperature of about 75° F. Now if the outside temperature decreases slightly, contact finger 97 will move along outdoor resistance 93 towards the left hand end thereof and change the effective resistance in circuit with solenoid coils 107 and 108 in such manner that solenoid coil 108 will become more highly energized than solenoid coil 107 whereupon plunger 110 will move to the right and bring switch arm 111 into engagement with contact 113. Engagement of switch arm 111 with contact 113 substantially short circuits field winding 62. In other words, the field winding 62 and the small number of turns of solenoid winding 108 are connected in parallel. The energizing circuit for field winding 66 is now as follows: secondary 150, wire 156, wire 191, limit switch arm 68, contact 67, field winding 66, wire 190, at which point the circuit branches, one part going by way of wire 189, field winding 62, contact 70, limit switch arm 71, wire 188 and wire 153 whereas the other portion thereof traverses a wire 197, relay switch arm 111, contact 113, wire 158, the small number of turns of solenoid winding 108 and wire 154 to wire 153 and thereby to the other side of secondary 150. Motor 64 therefore is now more highly energized than motor 60 and is able to rotate operating shaft 47 in a clockwise direction as viewed from the left in Fig. 1 whereupon lever 41 begins moving upwardly and balancing contact finger 116 moves slowly along balancing resistance 115 towards the right hand end thereof. This movement of main operating shaft 47 will continue until balancing contact finger 116 reaches a point on balancing resistance 115 such that the pull exerted on plunger 110 by solenoid coil 107 equals the pull exerted on plunger 110 by solenoid winding 108 and the energization of the small number of turns thereof, whereupon relay switch arm 111 will return to its mid-position between contacts 113 and 114. The energization of the small number of turns of solenoid coil 108 operates to slightly increase the contact pressure between relay switch arm 111 and contact 113 whereby to make a firm contact at this point. This slight upward movement of lever 41 brings damper 32 more nearly to its vertical position and the amount of outdoor air drawn into the space by blower 13 is proportionately decreased. In this manner, as the outdoor temperature continues to drop, the lever 41 will be moved upwardly in small increments until the outdoor temperature reaches 65° at which time the lever 41 will have been moved to its upper limit wherein damper 32 engages stop 77 and further outdoor air delivery to the space is discontinued. At this time, limit switch actuator 69 will have engaged limit switch arm 68 to move the same from engagement with contact 67 whereby field windings 62 and 66 cannot again be energized while switch arm 111 is either in its mid-position or out of engagement with contact 113. In this manner, upon a fall in outdoor temperature during the summer, the amount of outdoor air supplied to the space is gradually varied from a maximum to a point where no outside air is supplied thereto inasmuch as the outdoor temperature is below the desired indoor temperature.

Whenever the outdoor temperature rises, contact finger 97 will move along the outdoor resistance 93 towards the right hand end thereof and thereby change the effective resistance connected in circuit with solenoid coils 107 and 108 in an opposite manner to that previously described so that solenoid winding 107 becomes more highly energized than solenoid winding 108. Plunger 110 therefore moves to the left and brings relay switch arm 111 into engagement with contact 114. If limit switch arm 68 be out of engagement with contact 67 at this time, field winding 62 will be energized as follows: secondary 150, wire 156, wire 155, a small number of turns of solenoid coil 107, wire 157, contact 114, relay switch arm 111, wire 197, wire 189, field winding 62, contact 70, limit switch arm 71, wire 188, and wire 153 to the other side of secondary 150. If limit switch arm 68 is engaged with contact 67, engagement of relay switch arm 111 with contact 114 establishes a circuit as follows: secondary 150, wire 153, wire 188, limit switch arm 71, contact 70, field winding 62, wire 189 at which point the circuit branches, one portion traversing wire 190, field winding 66, contact 67, limit switch arm 68, and wire 191 to wire 156 while the other portion traverses wire 197, relay switch arm 111, contact 114, wire 157, a small number of turns of solenoid coil 107 and wire 155 to wire 156 which connects to the other side of secondary 150. In either event, the current flow through the small number of turns of solenoid winding 107 serves to increase the contact pressure between relay switch arm 111 and contact 114 and the motor 60 will be more highly energized than motor 64 so as to be effective to rotate main operating shaft 47 in a counter-clockwise direction as viewed from the left in Fig. 1. Such movement of main operating shaft 47 lowers lever 41 and moves balancing contact finger 116 along balancing resistance 115 towards the left hand end thereof to again equalize the pull exerted on plunger 110 and move relay switch arm 111 to its mid-position between contacts 113 and 114. This downward movement of lever 41 moves damper 32 away from stop 77 to increase the flow of outdoor air to the space. Whenever the outside air temperature returns to approximately 75° F., the dampers 31 and 32 and lever 41 will have been returned to the positions shown in Fig. 1 of the drawing.

If the outdoor temperature continues to rise, lever 41 will move downwardly in small increments from the position shown in Fig. 1 and initial downward movement from such position closes mercury switch 90 and moves damper 31 slightly towards stop 77 to decrease the supply of outdoor air furnished to the space. The compressor motor 16 is now conditioned for energization whenever the space temperature becomes too high so as to bring flexible blade 145 into engagement with contact 146. This compressor motor circuit is as follows: line 192, switch arm 127 of master switch 125, contact button 131, wire 193, wire 198, wire 199, blade 145, contact 146, wire 200, mercury switch 90, wire 201, wire 202, compressor motor 16, wire 203, contact button 122, switch arm 119 of summer-winter switch 117, and ground 195 to line 196. In this manner, the compressor motor 16 is energized whenever the space temperature becomes excessive if the outdoor temperature is too high. As the outdoor temperature continues to rise, damper 31 is moved more closely to stop 77.

When the outdoor temperature reaches 80° F., movable contact finger 97 will engage metallic cap 95 and the damper 31 will not be quite closed, the amount it is open depending upon the amount of resistance 98 in series with the outdoor resistance 93. As the outdoor temperature continues to rise, contact finger 97 will sweep across metallic cap 95 whereby this movement of contact finger 97 is not accompanied by any change in the effective resistance in circuit with the solenoid coils 107 and 108. But when some maximum outdoor temperature is reached, such as 90° F., the contact 102 will engage contact screw 100 whereby resistance 98 will be short circuited. At this time, solenoid winding 108 will be substantially short circuited and would be completely short circuited were it not for the inclusion of protective resistance 160. Relay switch arm 111 will therefore again engage contact 114 and lever 41 will be lowered until balancing contact finger 116 engages the extreme left end of balancing resistance 115 at which time solenoid coil 107 will be substantially short circuited and would be short circuited completely were it not for protective resistance 159. Solenoid coils 107 and 108 are therefore again equally energized and plunger 110 returns to its center position. This relatively rapid downward movement of lever 41 brings damper 31 into engagement with stop 77 so that no outdoor air is now supplied to the space since the outdoor temperature is so excessive as to require an undue amount of refrigeration if the space temperature is to be maintained at the desired point.

If, at any time, the relative humidity should become excessive humidity responsive element 140 will expand sufficiently to move switch arm 139 into engagement with contact 143 and compressor motor 16 will be energized irrespective of whether or not the space temperature is at the desired point and irrespective of the outdoor temperature. This circuit is as follows: line 192, switch arm 127, contact button 131, wire 193, wire 198, wire 204, switch arm 139, contact 143, wire 205, wire 202, compressor motor 16, wire 203, contact button 122, switch arm 119 and ground 195 to line 196. In this manner, whenever the relative humidity becomes excessive, the space temperature will be lowered below that desired, if necessary, so as to bring the effective temperature to a comfortable value.

Sometimes it may be desired to supply a maximum quantity of outdoor fresh air to the space for ventilating purposes irrespective of the outdoor temperature. In such an event, a full supply of fresh outdoor air may be furnished even though there would normally be a lesser or zero supply of outdoor air by reason of the automatic control system. This is accomplished by moving manually operable switch 187 to open circuit position. Such action electrically disconnects contact finger 97 from the junction of solenoid coils 107 and 108. Outdoor resistance 93 and resistance 98, in series, will therefore be connected directly in parallel with the series connected solenoid coils and likewise indoor resistance 104 and rheostat 174 in series will be connected directly in parallel with the series connected solenoid windings. The only unbalancing, therefore, of solenoid coils 107 and 108 that can take place will be due to balancing contact finger 116 being removed from the center of balancing resistance 115. If balancing finger 116 is removed from the center of balancing resistance 115, one or the other of solenoid coils 107 and 108 will become more highly energized than its companion coil, whereupon relay switch arm 111 will be moved in the necessary direction to energize the proper one of motors 60 or 64, whereby to return balancing contact finger 116 to the center of balancing resistance 115. Lever 41 will therefore move to the position shown in the drawing wherein dampers 31 and 32 are positioned to allow a full supply of fresh outdoor air to be delivered to the space being controlled.

From the foregoing description of the summer operation, it will be apparent that normally the amount of outdoor fresh air supplied to the space is at a maximum when the outdoor temperature is approximately that desired inside the space and that the supply of outdoor air is decreased as the outdoor temperature either rises above or falls below the temperature value which it is desired to maintain within the space. The summer operation of the system is also such that when the outdoor temperature has increased above the desired space temperature to such an extent as to only allow a predetermined small minimum flow of outdoor air to the space, then such minimum flow is maintained upon further increase in the outdoor temperature until the outdoor temperature becomes so excessive as to require an excessive amount of refrigeration to maintain the space temperature at the desired value at which time the supply of outdoor air to the space is immediately and quickly discontinued. The arrangement further is such that when the outdoor air temperature is above that approximately desired inside the space, cooling means may be operated to maintain the space temperature at the desired point but whenever the outdoor temperature becomes substantially that desired in the space, the cooling means is rendered inoperative except for certain abnormal conditions. However, in the event the relative humidity within the space becomes excessively high, the cooling means is operated irrespective of the space temperature in order to bring the effective temperature in the space to a comfortable value. Furthermore, a full supply of outdoor air can be delivered to the space under manual control, if desired, irrespective of the outdoor temperature.

Winter operation

For winter operation, the reversing switch 117 is thrown to the position opposite that shown in the drawing so that switch arm 118 disengages contact button 121 and engages contact button 123 and switch arm 119 disengages contact button 122 and engages contact button 124. Disengagement of switch arm 118 from contact button 121 disconnects movable member 97 from, and engagement of switch arm 118 with contact button 123 connects movable member 105 to, balancing contact finger 116 and the junction 109 of solenoid coils 107 and 108. As a result, outdoor controller 91 is rendered inoperative and indoor controller 103 is placed in command of the mechanism 34. It should be noted that both the cold side of indoor resistance 104 and the cold side of outdoor resistances 93 and 98 in series are connected to the left hand end of balancing resistance 115 whereby the action of the indoor controller upon mechanism 34 is the same as the action of outdoor controller 91 thereon. Movement of switch arm 119 from contact button 122 disconnects compressor motor 116 from the source of supply and conditions water valve 30 for actuation by the humidity control 138 as will hereinafter appear. For winter operation, the manually operable valve 27 should be opened and the bracket 81 should be moved to the position shown in dotted lines whereby to establish a lost motion connection between link 78 and pin 80 carried by lever 41. With the lever 41 in its mid-position, as shown in the drawing, the spring 76 will raise link 78 to take up the lost motion between link 78 and pin 80 whereby damper 32 moves into engagement with stop 77 and the supply of outdoor air to the space is discontinued. It will be noted that blower 13 remains continuously energized.

The rheostat 174 is manually adjusted so that there is an amount of resistance in series with indoor resistance 104 which is just equal thereto. Therefore, with the indoor or space temperature such that movable member 105 engages the extreme right hand end of indoor resistance 104, the movable member 105 is contacting the effective center of the combined resistance of resistance 104 and of the rheostat 174. The solenoid coils 107 and 108 are therefore equally energized and the balancing contact finger 116 is contacting the center of balancing resistance 115 with the result that lever 41 is in its mid-position wherein damper 32 closes off all outdoor air and the modulating or proportioning steam valve 84 is closed. It will be noted that further rise in the space temperature can have no effect on the control mechanism 34. In other words, when the rheostat 174 is adjusted so as to have a resistance equal to indoor resistance 104, the lever 41 cannot move downwardly beyond the position in which it is shown in the drawing. However, as the indoor temperature lowers so that movable member 105 moves along indoor resistance 104 towards the left end thereof, the solenoid coil 108 will become more highly energized than solenoid winding 107 and lever 41 will move upwardly as heretofore explained in connection with the summer operation. Upward movement of lever 41 is ineffective insofar as dampers 31 and 32 are concerned since the pin 80 merely moves upwardly in the slot 79 formed in link 78 and the damper 32 therefore remains in its closed position. Upward movement of lever 41 however, does allow spring 88 to lift link 86 an amount which is proportional to the upward movement of lever 41. As a result, the lever 41 moves from its mid-position to its extreme upper position as the indoor temperature falls from the desired maximum to the desired minimum value and the modulating steam valve 22 at the same time moves from its full closed position to its full open position. In this manner, the steam supply to heating coils 20 is modulated or proportioned in accordance with changes in the indoor temperature.

Under ordinary conditions, the room temperature will never reach its maximum limit but there are times when this condition may arise, for instance, when there is a rapidly rising outdoor temperature, the room temperature may become excessive or if a large group of people should be present in the room there again the temperature may approach the upper permissible limit. It may be desirable under this condition, or for that matter under all conditions, to introduce a small supply of outdoor air so long as the space temperature does not too closely approach its minimum desired limit or fall too far below its desired maximum limit. This can be accomplished by changing the setting of rheostat 174 so that a smaller amount of resistance is in series with indoor resistance 104. When this is done, movable member 105 must move away from the extreme right hand end of resistance 104 in order to contact the mid-point of the combined resistance of resistances 104 and the rheostat 174. This means that lever 41 will be in its mid-position when contact member 105 is displaced from the right hand end of resistance 104 a variable amount depending upon the adjustment of rheostat 174. It therefore follows that if movable member 105 moves past this effective center of these combined resistances and towards the right hand end of resistance 104, the lever 41 will move downwardly somewhat from its mid-position. The maximum downward movement of lever 41 when contact finger 105 is in the position shown in the drawing will depend upon the adjustment of rheostat 174. During downward movement of lever 41 from its center position, the tension of spring 89 is increased whereby modulating or proportioning steam valve 22 is maintained closed but the pin 80 carried by lever 41 will engage the lower end of slot 79 to move link 78 downwardly whereby damper 32 moves towards the position shown in the drawing to allow the supplying of a predetermined amount of outdoor air. In the event all of the resistance of rheostat 174 is removed from the circuit, the lever 41 will move through its full range, as described for summer operation, upon movement of movable member 105 from one end of indoor resistance 104 to the other end thereof. Under these conditions, when the space is cold, there will be a full supply of steam, when the space temperature is intermediate or between its hot and cold limits there will be no steam and damper 32 will still be closed, and when the space temperature is at its high limit dampers 31 and 32 will assume the position shown in the drawing wherein there is full supply of outdoor air. In this manner, by proper manipulation of rheostat 174, a variable amount of outdoor air ranging from zero to maximum supply may be furnished to the space to be heated.

If it should be desired to ventilate the space irrespective of the space temperature, manual switch arm 135 may be moved from engagement with contact 136 and into engagement with contact 137. Disengagement of switch arm 135 from contact 136 disconnects movable member 105 from the control system and movement of switch arm 135 into engagement with contact 137 substantially short circuits solenoid coil 108 as follows: solenoid 108, wire 162, protective resistance 160, wire 161, wire 176, wire 178, contact 137, switch arm 135, wire 180, contact button 123, switch arm 118, wire 181, contact button 130, switch arm 126, wire 167 and wire 165 to the junction 109. Solenoid coil 107 therefore becomes considerably more highly energized than solenoid coil 108 whereupon plunger 110 moves to the left to bring switch arm 111 into engagement with contact 114. As a result, lever 41 moves to its extreme lowermost position under the action of motor 60 and until limit switch 70—71 is open. This action moves dampers 31—32 to the position shown in the drawing wherein there is a full supply of outdoor air irrespective of the inside temperature and the steam valve 22 is closed. It should be understood that this manual switch 135 is provided only in order that the air in the space may be quickly changed if it should become desirable to do so.

Whenever the relative humidity of the air in the space becomes too low, the humidity responsive element 140 will contract and move switch arm 139 into engagement with contact 142 so as to energize water valve 30 as follows: line 192, switch arm 127, contact button 131, wire 193, wire 198, wire 204, switch arm 139, contact 142, wire 206, water valve 30, wire 207, contact button 124, switch arm 119 and ground 195 to line 196.

From the foregoing description of the winter operation, it will be seen that the blower 13 continuously circulates air through the air filters and over the heating coils into the space. The heating coils are provided with a variable amount of steam as the space temperature fluctuates and if desired, a variable amount of fresh air may be supplied to the space whenever the space temperature approaches its desired high limit by manual manipulation of rheostat 174. Furthermore, a full supply of fresh air can be supplied to the space at any time by manipulation of manual switch arm 135 irrespective of the space temperature. Whenever the relative humidity of the space becomes too low, the water valve 30 is actuated to supply water to the spray 28 whereby to increase the relative humidity in the space and maintain it above some predetermined minimum value.

*Operation of the master switch*

If the master switch 125 be thrown to the position opposite that shown in the drawing, the switch arm 126 thereof will disengage contact button 130 and engage contact button 133, switch arm 127 will disengage contact button 131, and switch arm 128 will disengage contact button 132 and engage contact button 134. Engagement of switch arm 131 with contact button 134 establishes a circuit to two-position valve 25 as follows: line 185, switch arm 128, contact button 134, wire 208, two-position valve 25 to line 187. The two-position steam valve 25 is therefore moved to closed position. It will be noted that this valve is moved to closed position irrespective of whether the system is operating on its summer or winter cycle so that in any event no steam can be supplied to the heating coils 20. Disengagement of switch arm 127 from contact button 131 interrupts all circuits for blower 13, compressor motor 16, and water valve 30. This also takes place irrespective of whether the system is operating on a summer or winter cycle so that no air can be circulated whatsoever, there can be no cooling, nor can there be any humidification. Disengagement of switch arm 126 from contact button 130 disconnects switch arm 121 of reversing switch 117 from the junction 109 of solenoid coils 107 and 108 so that neither movable member 105 nor 97 can be connected in the control system for mechanism 34. Engagement of switch arm 126 with contact button 133 substantially short circuits solenoid coil 107 as follows: solenoid coil 107, wire 164, protective resistance 159, wire 163, wire 169, wire 170, contact button 133, switch arm 126, wire 167, and wire 165 to the junction 109. Solenoid coil 108 therefore becomes more highly energized than solenoid coil 107 and plunger 110 moves to the right to bring switch arm 111 into engagement with contact 113. Lever 41 is therefore moved upwardly to its extreme position by means of motor 64 as heretofore explained and this upward movement will be limited by opening of limit switch 67—68. Irrespective of whether the system be operating on the summer cycle or the winter cycle, damper 32 will assume its vertical position wherein it engages stop 77 and the outdoor air inlet will be completely closed off. Modulating steam valve 22 will move to its full open position but this can have no effect inasmuch as two-position steam valve 25 has been moved to closed position.

From the foregoing description of the complete system, it will be seen that the present invention provides an all year around temperature control system by which a space or building may be maintained within definite temperature limits during the winter and the temperature thereof maintained below some predetermined maximum during the summer. It will be noted that the change-over from the summer cycle to the winter cycle is simply accomplished by a minimum number of manual operations all of which are extremely simple. It will further be seen that the manipulation of a single master switch renders the system completely inoperative irrespective of whether it be on the summer or winter cycle. In addition, both the summer cooling and the winter heating portions of the complete system contain many points of novelty in themselves as has heretofore been explained in detail in connection with the operation of each of these portions of the system.

It will be appreciated that many changes can be made in the entire system or in either its summer or winter operating characteristics by those skilled in the art without departing from the spirit of the invention and I am therefore to be limited only by the scope of the appended claims.

I claim:

1. A system of the class described, comprising, in combination, a combined heating and cooling system including variably positionable damper means for controlling the flow of outdoor air to a space which it is desired to control, means for controlling said damper means to move the same through one range in the winter, means for controlling said damper means to move the same through a different range in the summer, and a single manually operable master control for rendering the entire system inoperative and for operating said damper means to move the same to closed position to prevent the flow of outdoor air to said space irrespective of whether the damper means was being cntrolled for summer or winter operation.

2. A system of the class described, comprising, in combination, a combined heating and cooling chamber, circulating means for continuously causing a flow of air therethrough and into a space the temperature of which it is desired to control, damper means in control of the flow of air to said chamber from the outside atmosphere, heating and cooling means associated with said chamber and effective to change the temperature of the air passing therethrough, means for operating said damper means in one cycle and for controlling said cooling means in the summer, means for actuating said damper means in another cycle and for controlling said heating means in the winter, and a single manually operable master control associated with the damper means, heating means, cooling means, and circulating means for rendering the heating means, cooling means and circulating means inoperative and for operating said damper means to interrupt communication between said chamber and the outside atmosphere irrespective of whether the damper means is operating on a cooling or heating cycle.

3. A cooling system of the class described, comprising, in combination, means for circulating outdoor air to a space the temperature of which it is desired to control, damper means for controlling the volume of outdoor air supplied to said space, thermostatic means influenced by outdoor air temperature, and connections between said thermostatic means and said damper means by which the thermostatic means positions the damper means to allow a maximum supply of outdoor air when the temperature thereof is at one value and to decrease the supply of outdoor air as the temperature thereof rises or falls to other predetermined values above and below said first-mentioned temperature value.

4. A cooling system of the class described, comprising, in combination, means for circulating outdoor air to a space the temperature of which it is desired to control, damper means for controlling the volume of outdoor air supplied to said space, thermostatic means influenced by outdoor air temperature, and connections between said thermostatic means and said damper means by which the thermostatic means positions the damper means to allow a maximum supply of outdoor air when the temperature thereof is at one value and to gradually decrease the supply of outdoor air as the temperature thereof either rises above or falls below said temperature value.

5. A cooling system of the class described, comprising, in combination, means for circulating outdoor air to a space the temperature of which it is desired to control, damper means for controlling the volume of outdoor air supplied to said space, thermostatic means influenced by outdoor air temperature, and connections between said thermostatic means and said damper means by which the thermostatic means positions the damper means to allow a maximum supply of outdoor air when the temperature thereof is at one value and to decrease the supply of outdoor air as the temperature thereof rises or falls to other predetermined values above and below said first-mentioned temperature value, cooling means, a thermostat responsive to the temperature of the space in control of said cooling means and means associated with said thermostatic means to prevent control of the cooling means by the space temperature responsive thermostat when the outdoor air temperature reaches a predetermined low value.

6. A cooling system of the class described, comprising, in combination, means for circulating outdoor air to a space the temperature of which it is desired to control, damper means for controlling the volume of outdoor air supplied to said space, thermostatic means influenced by outdoor air temperature, connections between said thermostatic means and said damper means by which the thermostatic means positions the damper means to allow a maximum supply of outdoor air when the temperature thereof is at one value and to decrease the supply of outdoor air as the temperature thereof rises or falls to other predetermined values above and below said first-mentioned temperature value, cooling means, a thermostat responsive to the temperature of the space for operating said cooling means to maintain the space temperatue below a predetermined maximum, and a humidity responsive element responsive to the relative humidity of said space for additionally controlling said cooling means in a manner to place said cooling means in operation for dehumidifying the space when the space relative humidity becomes excessive.

7. A cooling system of the class described, comprising, in combination, circulating means for circulating outdoor air to a space, damper means movable from one extreme position to another extreme position for varying the volume of outdoor air supplied to said space, motor means in control of said damper means, thermostatic means influenced by outdoor air temperature for controlling said motor means to move the damper means between said extreme positions, and a manually operable device associated with said motor for operating the damper means to permit a predetermined maximum flow of outdoor air or to discontinue all flow of outdoor air to said space irrespective of the value of the outdoor air temperature.

8. A control system comprising, in combination, means for circulating outdoor air to a space, damper means in control of the volume of outdoor air supplied to said space, said damper means being arranged to vary the flow of outdoor air to said space from a minimum to a maximum and then to a minimum upon continuous movement of the damper means in one direction from a first position to a second position, electrical means associated with said damper means for moving the same, and an outdoor temperature influenced thermostat in control of said electrical means to control the electrical means to cause movement of said damper means from said first position to said second position upon change in said outdoor temperature in only one direction.

9. In combination, circulating means for circulating air to a space to be heated, damper means for permitting outdoor air to be supplied to said space, heating means for heating the air supplied to said space, an electrically operable device including a movable element, connections between said element, heating means and damper means for gradually decreasing the heat supplied by said heating means while maintaining said damper means in position to prevent circulation of outdoor air to said space until the heating means has been rendered inoperative and thereafter maintaining said heating means inoperative and operating the damper means to gradually permit the supplying of an increasing amount of outdoor air to said space during continuous movement of said element in a single direction through a predetermined range, a thermostat connected to said device for operating the same to move said element through said range upon a predetermined temperature variation, and means associated with said thermostat and device for reducing the range of movement of said element upon said predetermined temperature variation.

10. A cooling system of the class described, comprising, in combination, damper means in control of the flow of outdoor air to a space to be controlled, motor means in control of said damper means, thermostatic means influenced by outdoor temperature, connections between said thermostatic means and said motor means by which the thermostatic means positions the damper means to allow a maximum supply of outdoor air to flow to said space when the outdoor temperature is at a given value and to decrease the supply of outdoor air upon rise or fall of the outdoor temperature above or below said value, cooling means to cool the space, means responsive to the temperature of the space for controlling said cooling means in a manner to place said cooling means in operation when the space temperature rises to a predetermined value, and means influenced by space relative humidity for placing said cooling means in operation when space relative humidity rises above a predetermined value.

11. A cooling system of the class described, comprising, in combination, damper means in control of the flow of outdoor air to a space to be controlled, motor means in control of said damper means, thermostatic means influenced by outdoor temperature, connections between said thermostatic means and said motor means by which the thermostatic means positions the damper means to allow a maximum supply of outdoor air to flow to said space when the outdoor temperature is at a given value and to decrease the supply of outdoor air upon rise or fall in the outdoor temperature above or below said value, cooling means to cool the space, a space temperature responsive control normally in control of said cooling means to maintain the space temperature at substantially the same value as that outdoor temperature at which the maximum flow of outdoor air to the space is permitted, and a space relative humidity responsive control operative to control said cooling means irrespective of the space temperature if the relative humidity of the air in the space becomes too high.

12. A cooling system of the class described, comprising, in combination, a movable member movable back and forth across a predetermined path of travel, motor means in control of said movable member, an outdoor temperature influenced thermostat in control of said motor means which controls the motor means in accordance with the outdoor temperature, damper means in control of the flow of fresh air to a space to be conditioned, connections between said movable member and damper means, electrically controlled cooling means, a controller in control thereof, and a switch operated by said movable member when in a predetermined position to prevent operation of said cooling means by said controller.

13. A system of the class described, comprising, in combination, damper means in control of the flow of fresh air to a space, a movable member in control of said damper means and operative to move the damper means from a position permitting a maximum flow of fresh air to the space to a position in which no flow of fresh air to said space is permitted, electric motor means in control of said movable member and operative to move the same throughout its complete range, variable resistance means in control of said motor means operative to position the motor means according to the condition of said variable resistance means, means influenced by outdoor temperature to gradually vary said variable resistance means from its extreme condition which represents a full flow of fresh air throughout the maximum portion of its possible variation, and a switch operated at a definite temperature in control of the remaining possible variation of said variable resistance means.

14. In a damper control for an air conditioning system, in combination, damper means in control of the flow of outdoor air to a space to be controlled, a movable member, connections between the movable member and damper means by which continuous movement of the movable member throughout a predetermined range moves said damper means from a position in which no outdoor air is permitted to flow to said space, to a position in which a maximum flow of outdoor air to said space is permitted and then to a position in which no flow of outdoor air is permitted to said space, reversible motor means in control of said movable member, switching means in control of said reversible motor means, a pair of oppositely acting electrical devices in control of said switching means, a variable resistance controller responsive to temperature conditions associated with said oppositely acting electrical means and operative to vary the respective energizations thereof whereby to operate said switching means, and a variable resistance device operated by said motor means associated with said oppositely acting electrical devices operative to reestablish their normal respective energizations when the reversible motor means has positioned the movable member in accordance with the temperature to which said controller responds.

15. In a damper control for an air conditioning system, in combination, damper means in control of the flow of outdoor air to a space to be controlled, a movable member, connections between the movable member and damper means by which continuous movement of the movable member throughout a predetermined range moves said damper means from a position in which no outdoor air is permitted to flow to said space, to a position in which a maximum flow of outdoor air to said space is permitted and then to a position in which no flow of outdoor air is permitted to said space, reversible motor means in control of said movable member, switching means in control of said reversible motor means, a pair of oppositely acting electrical devices in control of said switching means, a variable resistance controller responsive to temperature conditions associated with said oppositely acting electrical means and operative to vary the respective energizations thereof whereby to operate said switching means, a variable resistance device operated by said motor means associated with said oppositely acting electrical devices operative to reestablish their normal respective energizations when the reversible motor means has positioned the movable member in accordance with the temperature to which said controller responds, an external resistance in series with said variable resistance controller whereby the movable member cannot be moved to one of its extreme positions, and a switch to short-circuit said external resistance.

16. In a control system, in combination, a movable member movable throughout a given range, a device to be controlled thereby, motor means in control of said movable member, a first controller associated with said motor means operative to cause the same to move the movable member throughout its complete range of movement, a second controller associated with said motor means operative to cause the same to move the movable member through only a portion of its complete range of movement, and means to selectively place one or the other of said controllers in control of said motor means.

17. In a control system, in combination, a movable member movable throughout a given range, a device to be controlled thereby, electric motor means connected to said movable member and operable to move the same throughout its complete range of movement, a first variable resistance controller for operating said motor means to move said movable member through its complete range of movement, a second variable resistance controller for operating said motor means to move said movable member through only a portion of its complete range of movement, and switching means selectively operable to place one or the other of said variable resistance controllers in control of said motor means.

18. In a control system, in combination, a movable member movable throughout a given range, a device to be controlled thereby, reversible motor means connected to said movable member and operative to move the same throughout its complete range of movement, switching means oppositely operable to cause reverse rotations of said motor means, a pair of oppositely acting electrical devices in control of said switching means and operable to move said switching means to a position in which said motor means is stopped when said devices are substantially equally energized, current varying means operated by the reversible motor means and associated with said electrical devices to maintain their energizations substantially equal at all times, a first controller operative to vary the respective energizations of said devices sufficiently to cause movement of said movable member throughout substantially its complete range, a second controller operative to vary the respective energizations of said devices only sufficiently to cause movement of said movable member through a part of its complete range, and switching mechanism selectively operable to place one or the other of said controllers in control of the energizations of said electrical devices.

19. In a control system, in combination, a movable member movable throughout a given range, a device to be controlled thereby, reversible motor means connected to said movable member and operative to move the same throughout its complete range of movement, switching means oppositely operable to cause reverse rotations of said motor means, a pair of oppositely acting electrical devices in control of said switching means and operable to move said switching means to a position in which said motor means is stopped when said devices are substantially equally energized, current varying means operated by the reversible motor means and associated with said electrical devices to maintain their energizations substantially equal at all times, a first controller operative to vary the respective energizations of said devices sufficiently to cause movement of said movable member throughout substantially its complete range, a second controller operative to vary the respective energizations of said devices only sufficiently to cause movement of said movable member through a part of its complete range, and switching mechanism selectively operable to place one or the other of said controllers in control of the energizations of said electrical devices, or to disconnect both of said controllers from said electrical devices whereby the motor means will move to a position in which the energizations of said devices are substantially equal.

20. A control system of the class described, comprising in combination, a heating system for heating a space during cold weather and including an element movable from a first position to a second position and back again, electrical means in control of said element, said electrical means requiring the application of electrical power thereto in order to move said element to either of its positions, a cooling system for cooling the space in warm weather and including a member movable from a first position to a second position and back again, a second electrical means in control of said member, said second electrical means requiring the application of electrical power thereto in order to move said member to either of its positions, and a single switching mechanism connected in circuit with both of said electrical means and selectively operable to energize both of said means in a manner to move said element and said member to predetermined positions or to place both of said electrical means under normal control of said systems.

21. A control system of the class described, comprising, in combination, an electrically controlled cooling system for cooling a space, an electrically controlled heating system for heating the space, one of said systems including an element movable from a first position to a second position and back again, electrical means in control of said element, said electrical means requiring the application of electrical power thereto in order to move said element to either of its positions, means selectively operable to place either of said systems in operation, and master control means operable to render both of said systems inoperative irrespective of the position of said last-named means and to energize said electrical means in a manner to move said element to a predetermined position.

22. A system for controlling the flow of fresh air to a space, comprising, in combination, a variably positionable damper in control of the flow of fresh air to the space, motor means to operate said damper, variable resistance means in control of said motor means to move said damper from full open position to full closed position upon a predetermined variation of said variable resistance means, thermostatic means influenced by outdoor temperature associated with said variable resistance means operable to vary the same only a part of said predetermined amount whereby said thermostatic means only moves said damper through a portion of said range, and a switch associated with said resistance means to vary the same the rest of said predetermined amount.

23. A system for controlling the flow of fresh air to a space, comprising, in combination, a variably positionable damper in control of the flow of fresh air to the space, motor means to operate said damper, variable resistance means in control of said motor means to move said damper from full open position to full closed position upon a predetermined variation of said variable resistance means, thermostatic means influenced by outdoor temperature associated with said variable resistance means operable to vary the same only a part of said predetermined amount whereby said thermostatic means only moves said damper through a portion of said range, and a switch associated with said resistance means to vary the same the rest of said predetermined amount, said switch also being controlled in accordance with outdoor temperature but being operated at a temperature value substantially removed from that temperature value at which said thermostatic means has varied said resistance means the largest amount possible.

24. A cooling system of the class described, comprising in combination, circulating means for circulating outdoor air to a space, damper means for varying the volume of outdoor air supplied to said space, electric motor means in control of said damper means, thermostatic means in control of said electric motor means to cause movement of said damper means from one extreme position to another extreme position, and switching means associated with said electric motor means operable to position said damper means in a position intermediate said extreme positions or in one of its extreme positions.

25. In an air conditioning system for a space, in combination, damper means in control of the flow of fresh air to the space, first means responsive to an air condition to move said damper means from open position towards closed position upon change of said condition to values either above or below an optimum value, second means responsive to an air condition to move said damper means towards open position upon change in said last-named condition in only one direction, and means to selectively place said first or second means in control of said damper means.

26. In an air conditioning system for a space, in combination, damper means in control of the flow of fresh air to the space, first means responsive to an air condition to move said damper means from open position towards closed position upon change of said condition to values either above or below an optimum value, second means responsive to an air condition to move said damper means towards open position upon change in said last-named condition in only one direction, means to selectively place said first or second means in control of said damper means, and means to place said damper means in full open position irrespective of the value of the conditions to which said first and second means respond.

27. In a heating and cooling system for a space, in combination, means to heat the space, means to cool the space, means in control of the supplying of fresh air to said space, space temperature responsive means in control of said fresh air supplying means and heating means operative to control the heating means to maintain the space temperature above a predetermined minimum and to control the fresh air supplying means to increase the supply of fresh air to the space if the space temperature becomes too high, means responsive to space temperature to control said cooling means, means responsive to an outdoor condition in control of said fresh air supplying means to decrease the supply of fresh air to the space if said condition increases above or decreases below an optimum value, and means to selectively place said first-mentioned space temperature responsive means in control of said heating means and fresh air supplying means or said outdoor condition responsive means and second-mentioned space temperature responsive means in control of said fresh air supplying means and said cooling means.

28. A temperature control system of the class described, comprising, in combination, a temperature changer for changing the temperature of a space to be controlled, means to deliver outdoor air to said space, damper means in control of the flow of outdoor air to said space, means including an outdoor temperature influenced thermostat to position said damper means to reduce the flow of outdoor air to said space when the outdoor temperature either rises to a high value or falls to a low value, and means responsive to space temperature controlling said temperature changer to maintain the space temperature at a value between said high and low outdoor temperature values.

29. A cooling system of the class described, comprising, in combination, a cooling device for lowering the temperature of a space to be controlled, means to deliver outdoor air to said space, damper means in control of the flow of outdoor temperature influenced air to said space, means including an outdoor thermostat to position said damper means to reduce the flow of outdoor air to said space when the outdoor temperature either rises to a high value or falls to a low value, and means responsive to space temperature controlling said cooling device to maintain the space temperature at or below a value between said high and low outdoor temperature values.

30. A temperature changing system of the class described, comprising, in combination, a temperature changer to change the temperature of a space, means to deliver outdoor air to said space, damper means in control of the flow of outdoor air to the space, motor means in control of said damper means, an outdoor temperature influenced thermostat in control of said motor means to variably position the same, a space temperature responsive thermostat in control of said temperature changer, and means operated by said motor means to permit control of the temperature changer by the space temperature responsive thermostat only during a portion of the range of movement of the motor means.

31. A cooling system of the class described, comprising, in combination, a cooling device to lower the temperature of a space, means to deliver outdoor air to said space, damper means in control of the flow of outdoor air to the space, motor means in control of said damper means, an outdoor temperature influenced thermostat in control of said motor means to variably position the same, a space temperature responsive thermostat in control of said cooling device, means operated by said motor means to permit control of the cooling device by the space temperature responsive thermostat only during a portion of the range of movement of the motor means, and means responsive to the relative humidity of the space to operate the cooling device upon high space relative humidity irrespective of the position of said motor means.

32. In a heating and cooling air conditioning system, in combination, means for cooling a space, means for heating said space, means for supplying fresh air to said space, temperature responsive means for controlling said heating and cooling means, said temperature responsive means being arranged for controlling said heating means in a manner to increase the supply of heat upon increase of heat demand during the heating cycle of the system, and to increase the operation of the cooling means upon increase in demand for cooling during the cooling cycle, thermostatic means responsive to outside temperature, thermostatic means responsive to space temperature, and means for placing said space thermostatic means in control of said fresh air supplying means during the heating cycle, and for placing said outside thermostatic means in control of said fresh air supplying means during the cooling cycle.

33. In an air conditioning system, in combination, a conditioning chamber through which air is adapted to be passed, means for causing a flow of air through said conditioning chamber and to a space to be conditioned, means for withdrawing air from said space and for passing it to said conditioning chamber, fresh air supply means for said conditioning chamber, a fresh air flow controller in control of the flow of fresh air into said conditioning chamber, reversible electric motor means for positioning said controller, thermostatic means influenced by outside temperature, and circuit connections controlled thereby in control of said electric motor means and operative to energize said electric motor means in a manner to operate said air flow controller to a position for reducing the supply of fresh air to said conditioning chamber when the temperature of said thermostatic means rises above or falls below predetermined values.

34. In an air conditioning system, in combination, a conditioning chamber, duct means for connecting said conditioning chamber with a space to be conditioned, means for supplying fresh air to said space, means for controlling the fresh air supply, thermostatic means for controlling said fresh air supply controlling means, said thermostatic means and said fresh air supply controlling means being arranged to cause the supply of fresh air to be increased upon temperature fall at said thermostatic means and to be decreased upon temperature rise at said thermostatic means, means for cooling the air as it passes through said conditioning chamber, and means actuated by said fresh air supply controlling means for preventing operation of said cooling means when a predetermined amount of fresh air is being supplied to said space.

35. In an air conditioning system, in combination, a conditioning chamber, duct means for connecting said conditioning chamber with a space to be conditioned, condition changing means in said chamber for changing the condition of the air in said space, condition responsive means influenced by the condition of the air in said space for controlling said condition changer for maintaining desired space conditions, means for supplying fresh air to said space, means for controlling the fresh air supply, thermostatic means for controlling the fresh air supply controlling means, said thermostatic means and said fresh air supply controlling means being arranged to cause a maximum amount of fresh air to be supplied when the fresh air temperature is such that it aids in maintaining desired conditions within the space and to decrease the fresh air supply when the fresh air temperature deviates from such value, and means for preventing operation of said condition changer when a predetermined volume of fresh air is being supplied to said space.

36. In an air conditioning system, in combination, a conditioning chamber, duct means for connecting said conditioning chamber with a space to be conditioned, means for supplying fresh air to said space, thermostatic means for controlling said fresh air supply controlling means, said thermostatic means and said fresh air supply controlling means being arranged to cause a maximum amount of fresh air to be supplied when the fresh air temperature is such that it aids in maintaining desired conditions within the space and to decrease the fresh air supply when the fresh air temperature deviates from such value, means for heating the space, means for cooling the space, means for controlling said heating means and said cooling means, means for restricting the fresh air supply when the heating means is in operation, and means for preventing operation of the cooling means when a predetermined amount of fresh air is being supplied to said space.

37. In an air conditioning system, in combination, a conditioning chamber, means including a fan for causing air to flow through said conditioning chamber to a space being conditioned, means for supplying fresh air to said space, a damper for controlling the fresh air supply, electric motor means for actuating said damper, condition responsive means influenced by outside temperature for controlling said electric motor means in a manner to cause the position of the damper to be shifted towards closed position upon rise or fall in outside temperature above or below a predetermined value, a controller for controlling the operation of said fan, and means controlled by said fan controller for causing said electric motor means to run to a position in which the damper is substantially closed whenever said fan is placed out of operation.

38. In an air conditioning system, in combination, a conditioning chamber, means including a fan for causing air to flow through said conditioning chamber to a space being conditioned, means for supplying fresh air to said space, a damper for controlling the fresh air supply, electric motor means for actuating said damper, said electric motor means having a control circuit, a damper position controller connected into said control circuit for graduatingly controlling said damper motor means in a manner to provide a plurality of damper positions, a fan controller for controlling the operation of said fan, and means controlled by said fan controller connected into said control circuit with said damper position controller for causing said electric motor means to run to a position in which the damper is substantially closed when the fan is placed out of operation, irrespective of said damper position controller.

39. In an air conditioning system, in combination, a conditioning chamber, means including a fan for causing air to flow through said conditioning chamber to a space being conditioned, means for supplying fresh air to said space, a damper for controlling the fresh air supply, electric motor means for actuating said damper, a controller for controlling the operation of said fan, and means controlled by said fan controller for causing said electric motor means normally to run said damper from a substantially closed position to at least a predetermined minimum open position when the fan is placed into operation, and for causing said electric motor means to run to a position in which the damper is substantially closed whenever said fan is placed out of operation.

40. In an air conditioning system, in combination, means including a fan for supplying fresh air to a space to be conditioned, a damper for controlling the supply of fresh air, electric motor means for operating said damper, condition responsive means for controlling said damper motor means to cause the supply of fresh air to be varied in accordance with changes in value of the condition to which said condition responsive means responds, means for normally preventing said condition responsive means from operating said electric motor means to a position in which said damper is closed for thereby normally maintaining at least a minimum fresh air supply, a controller for controlling the operation of said fan, and means controlled by said fan controller for causing said electric motor means to run to a position in which the damper is substantially closed whenever the fan is placed out of operation.

41. In an air conditioning system, in combination, means including a fan for supplying fresh air to a space to be conditioned, a damper for controlling the supply of fresh air, damper motor means for actuating said damper, condition responsive means for controlling said damper motor means to cause the supply of fresh air to be varied in accordance with changes in value of the condition to which said condition responsive means responds, means for normally preventing said condition responsive means from operating said motor means to a position in which the damper is closed for thereby normally maintaining at least a minimum supply of fresh air, a controller for controlling the operation of said fan, and means controlled by said fan controller for operating said motor means in a manner to cause substantially complete closing of the fresh air damper when said fan is placed out of operation.

42. In a heating and cooling air conditioning system, in combination, means for cooling a space, means for heating said space, means for supplying fresh air to said space, means for controlling said heating and cooling means, said controlling means being arranged for controlling said heating means in a manner to increase the supply of heat upon increase in heat demand during the heating cycle, and to increase the operation of the cooling means upon increase in demand for cooling during the cooling cycle, a damper for controlling the supply of fresh air, electric motor means for actuating said damper, an outside temperature responsive thermostat, a thermostatic means influenced by space temperature, and electrical connections between said outside temperature responsive thermostat, said space temperature influenced thermostatic means, and said electric motor means, for placing said outside temperature responsive thermostat in control of said electric motor means during the cooling cycle, and for placing said inside temperature influenced thermostatic means in control of said electric motor means during the heating cycle.

43. In a heating and cooling air conditioning system, in combination, means for cooling a space, means for heating a space, means for supplying fresh air to said space, controlling means for controlling said heating and cooling means, said controlling means being arranged for controlling said heating means in a manner to increase the supply of heat upon increase in heat demand during the heating cycle of the system, and to increase the operation of the cooling means upon increase in demand for cooling during the cooling cycle, thermostatic means influenced by inside and outside temperature for controlling said fresh air supplying means, and means for substantially restricting the fresh air supply when said heating means is placed into operation.

44. In a cooling system of the class described, in combination, circulating means for circulating outdoor air to a space the temperature of which it is desired to control, means to cool the space, damper means associated with said circulating means for varying the volume of the outdoor air supplied to said space, outside temperature influenced thermostatic means for controlling said damper means, said thermostatic means including a controller associated with said damper means in a manner to provide a maximum supply of outdoor air when outside temperature is at one value and to reduce the outdoor air supply when outside temperature rises to a higher value, means for preventing said controller from completely closing said damper when the outside temperature is below a value which does not place an excessive load upon the system, to thereby provide a minimum fresh air supply, and means for placing said last mentioned means out of operation when the outdoor temperature becomes excessive.

45. In an air conditioning system, in combination, a conditioning chamber, means for causing a flow of air through said conditioning chamber to a space to be conditioned, means for supplying fresh air to said space, a damper for controlling the flow of fresh air, means for positioning said damper for varying the supply of fresh air to said space in accordance with the condition of the fresh air available, a cooling coil in said conditioning chamber arranged to be directly contacted by the air flowing through said chamber, power actuated means connected to said cooling coil for supplying liquid refrigerant to said cooling coil and for withdrawing evaporated refrigerant from said cooling coil, means including a space temperature responsive thermostat for placing said power actuated means into operation when the space temperature becomes excessive to thereby reduce the space temperature, and means including a humidity responsive device for placing said power actuated means into operation independently of the temperature responsive means whenever the space relative humidity becomes excessive.

GEORGE D. KINGSLAND.

CERTIFICATE OF CORRECTION.

Patent No. 2,123,428. July 12, 1938.

GEORGE D. KINGSLAND.

It is hereby certified that error appears in the printed specification of the above numbered patent requiring correction as follows: Page 12, first column, line 57, claim 29, strike out the words "temperature influenced" and insert the same before "thermostat" in line 58, same claim; and that the said Letters Patent should be read with this correction therein that the same may conform to the record of the case in the Patent Office.

Signed and sealed this 2nd day of May, A. D. 1939.

Henry Van Arsdale (Seal)  Acting Commissioner of Patents.